(12) United States Patent
Byrd et al.

(10) Patent No.: US 11,560,829 B2
(45) Date of Patent: Jan. 24, 2023

(54) RECIRCULATION SYSTEM FOR A POWER SYSTEM THAT INCLUDES A PLURALITY OF TURBOCHARGERS

(71) Applicant: Caterpillar Inc., Peoria, IL (US)

(72) Inventors: Jeremy Byrd, West Lafayette, IN (US); Eric Lee Schroeder, Germantown Hills, IL (US); David Andrew Pierpont, Dunlap, IL (US); Brian R. Bell, West Lafayette, IN (US); Deborah Lee Ribordy, Chillicothe, IL (US); Jared P. Tolan, Germantown Hills, IL (US); Craig P. Hittle, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 338 days.

(21) Appl. No.: 16/732,783

(22) Filed: Jan. 2, 2020

(65) Prior Publication Data
US 2021/0207526 A1 Jul. 8, 2021

(51) Int. Cl.
*F02B 37/00* (2006.01)
*F02B 37/16* (2006.01)
*F02B 39/16* (2006.01)
*F02B 29/04* (2006.01)
*F02B 37/007* (2006.01)
*F02B 33/40* (2006.01)

(52) U.S. Cl.
CPC ........ *F02B 37/002* (2013.01); *F02B 29/0431* (2013.01); *F02B 37/007* (2013.01); *F02B 37/16* (2013.01); *F02B 39/16* (2013.01); *F01P 2060/02* (2013.01); *F02B 33/40* (2013.01); *F02B 2039/168* (2013.01); *F05D 2240/40* (2013.01)

(58) Field of Classification Search
CPC .... F02B 37/001; F02B 37/002; F02B 37/007; F02B 37/16; F02B 2037/125; F02B 2037/122; F02B 39/16; F02B 2039/166; F02B 2039/168; F02B 29/0431; F02B 33/40; F01P 2060/02; F05D 2240/40
USPC ........... 60/600–603, 611, 612; 123/383, 562, 123/564
See application file for complete search history.

(56) References Cited

U.S. PATENT DOCUMENTS

| | | | |
|---|---|---|---|
| 6,782,849 B2 | 8/2004 | Roithinger | |
| 7,281,378 B2 | 10/2007 | Gu et al. | |
| 2013/0192223 A1* | 8/2013 | Pierpont | F01N 13/107 60/605.2 |
| 2015/0337747 A1* | 11/2015 | de Cesare | F02D 41/26 60/608 |
| 2016/0047339 A1* | 2/2016 | Kuze | F02D 41/0007 60/600 |
| 2019/0112991 A1 | 4/2019 | Dudar | |

(Continued)

FOREIGN PATENT DOCUMENTS

WO 2009095097 A1 8/2009

*Primary Examiner* — Mickey H France
(74) *Attorney, Agent, or Firm* — Harrity & Harrity, LLP

(57) ABSTRACT

A recirculation system for a power system is disclosed. The recirculation system may determine, according to a sequence for individually activating a plurality of turbochargers of an engine, that a designated turbocharger of the plurality of turbochargers is to be activated. The recirculation system may cause a recirculation valve of a recirculation line to open to increase an airflow between an intake manifold and a compressor of the designated turbocharger.

18 Claims, 4 Drawing Sheets

(56) References Cited

U.S. PATENT DOCUMENTS

| | | |
|---|---|---|
| 2019/0226389 A1 | 7/2019 | Byrd et al. |
| 2021/0071601 A1* | 3/2021 | Araki ................. F02D 41/3029 |

* cited by examiner

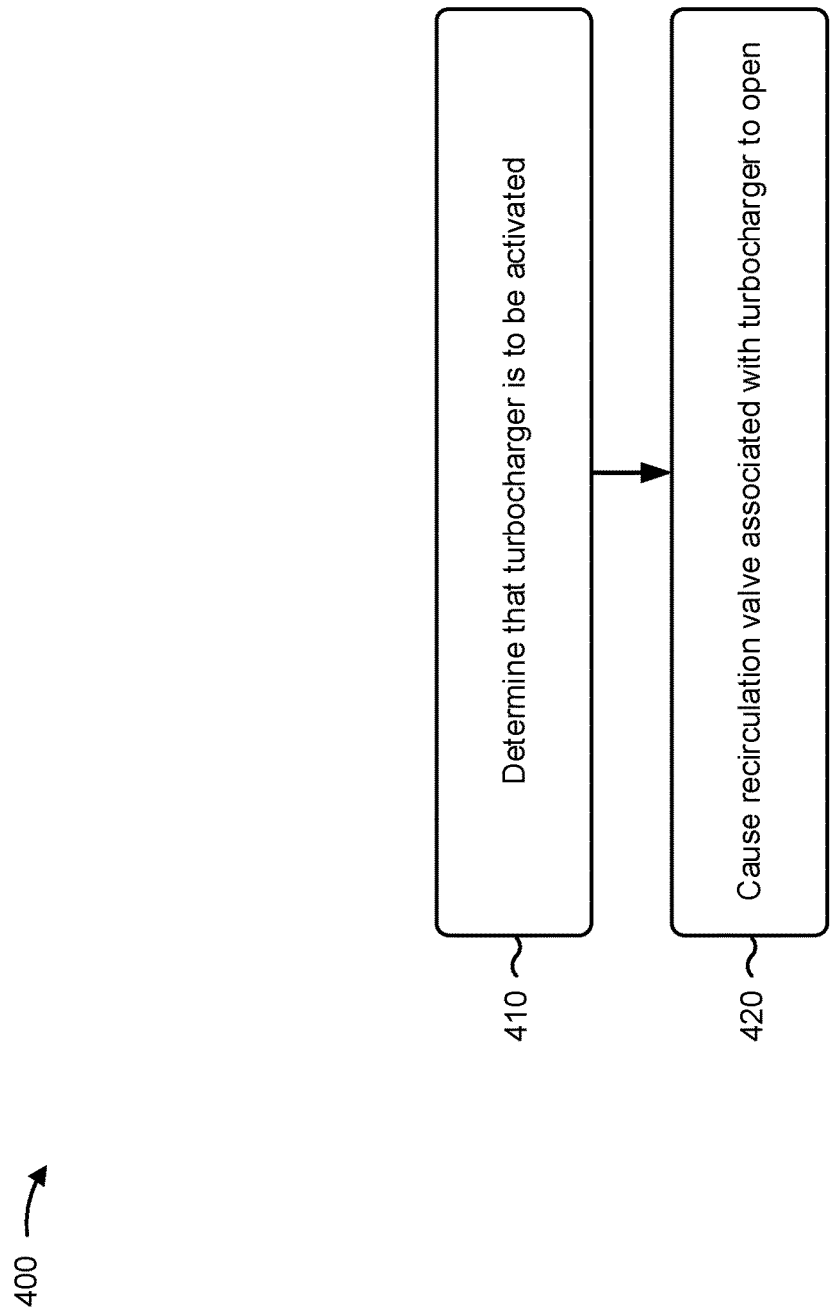

RECIRCULATION SYSTEM FOR A POWER SYSTEM THAT INCLUDES A PLURALITY OF TURBOCHARGERS

TECHNICAL FIELD

The present disclosure relates generally to a power system with a plurality of turbochargers and, for example, to a recirculation system for a power system that includes a plurality of turbochargers.

BACKGROUND

An electronic control module (ECM) of a power system may facilitate control of the power system according to certain operational conditions and/or limits of certain parameters of the power system. According to previous techniques, for a power system that includes a single engine and multiple turbochargers (e.g., a turbocharged engine), the ECM, according to the operational conditions, can sequentially activate the turbochargers. In such a case, when sequentially activating turbochargers, a designated turbocharger that is being activated (or turned on) to increase airflow through the power system tends to overshoot a rated speed (e.g., an operational speed or steady state speed of the designated turbocharger), reducing a useful life of the turbocharger(s).

One approach for a compressor active surge control system is disclosed in U.S. Pat. No. 7,281,378 that issued to Gu et al. on Oct. 16, 2007 ("the '378 patent"). In particular, the '378 patent discloses a compressor inlet line that is connected to an ambient air source, such as an intake scoop beneath a hood of an automobile.

While the compressor active surge control system of the '378 patent describes reducing an incidence of surge, the compressor inlet is connected to the ambient air source and includes a dedicated air cooler for cooling recirculated air.

The turbocharger controller of the present disclosure solves one or more problems set forth above and/or in the art.

SUMMARY

According to some implementations, a power system may include an engine; a plurality of turbochargers associated with the engine; a recirculation system configured between a first turbocharger of the plurality of turbochargers and an intake manifold of the engine; and a controller to: determine that the first turbocharger is to be activated according to a turbocharger activation sequence associated with the plurality of turbochargers; and cause, based on determining that the first turbocharger is to be activated, a recirculation valve of the recirculation system to open to allow airflow between the intake manifold and a compressor of the first turbocharger.

According to some implementations, a method may include determining, according to a sequence for individually activating a plurality of turbochargers of an engine, that a designated turbocharger of the plurality of turbochargers is to be activated; and causing a recirculation valve of a recirculation line to open to increase an airflow between an intake manifold and a compressor of the designated turbocharger.

According to some implementations, turbocharger configuration for an engine may include a plurality of turbochargers that are sequentially activated to provide airflow to the engine according to a characteristic of the engine; and a recirculation system situated between an intake manifold of the engine and a compressor of a designated turbocharger of the plurality of turbochargers, wherein the recirculation system is configured to prevent, by recirculating air from the intake manifold to the compressor, the designated turbocharger from exceeding a threshold speed after the designated turbocharger is activated to increase airflow to the engine.

BRIEF DESCRIPTION OF THE DRAWINGS

FIG. 4 is a flowchart of an example process associated with a recirculation system for a power system that includes a plurality of turbochargers.

DETAILED DESCRIPTION

This disclosure relates to a turbocharger controller that controls a turbocharger, of a plurality of turbochargers of a turbocharger configuration, using a recirculation system. The turbocharger controller and/or recirculation system, as described herein, has universal applicability to any machine utilizing such a power system with a turbocharger configuration that includes a plurality of turbochargers configured to sequentially increase or decrease airflow to an engine of the power system. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, or marine equipment.

Figure 1:
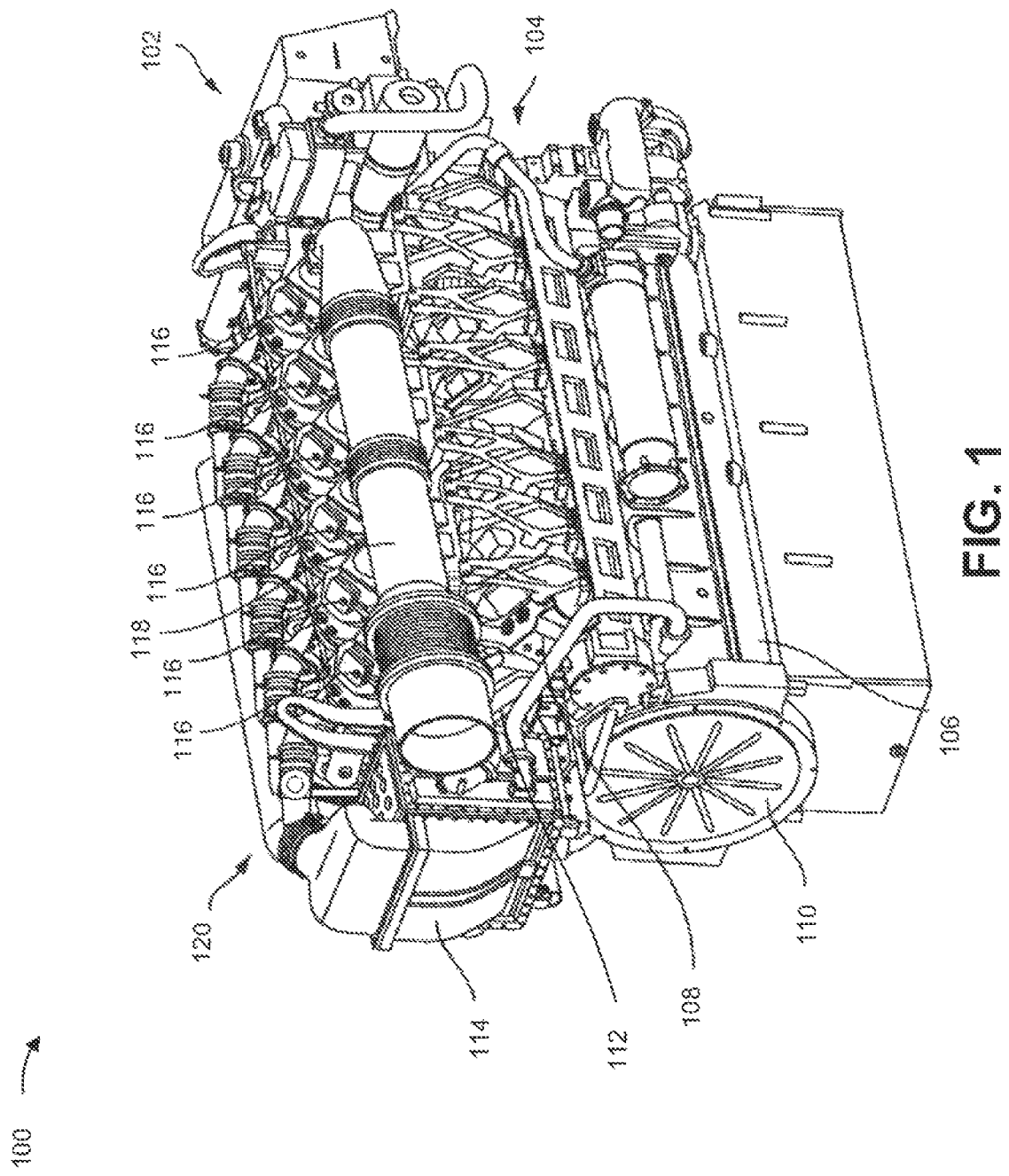
FIG. 1 is a view of an example power system described herein.

FIG. 1 is a diagram of an example implementation of a power system 100 described herein. An engine 102 of power system 100 includes a plurality of cylinders 104 coupled to a crankshaft within a case 106. The crankshaft is connected to a plurality of pistons that are respectively housed (e.g., slidably and reciprocally) within the plurality of cylinders 104. Cylinder head 108 covers cylinders 104 to form combustion chambers that power the crankshaft to provide a useful mechanical working motion to a flywheel 110 and/or output of engine 102.

Cylinder head 108 includes valves for providing fuel and air to cylinders 104, and also for removing exhaust gases and other byproducts from cylinders 104 during operation. Air is provided to cylinders 104 via an intake manifold 112, which receives a charge through an intercooler 114 (e.g., a separate circuit air cooler (SCAC) and/or other type of intake cooling system) which may receive compressed air via a plurality of turbochargers 116 (referred to herein individually as "turbocharger 116", and collectively as "turbochargers 116"). Exhaust gases are provided to turbochargers 116 (shown as six turbochargers) from various cylinders 104 through an exhaust log structure, described herein. Exhaust gas may exit power system 100 via an exhaust collector 118 through turbines of turbochargers 116.

As described herein, power system 100 may include a recirculation system 120 that is coupled to one or more of the plurality of turbochargers 116 and intake manifold 112 of engine 102. Recirculation system 120 controls airflow (e.g., via a recirculation line and a recirculation valve) between a compressor of turbocharger 116 and intake manifold 112. The airflow includes cooled air from intercooler 114 that may slow a speed of turbocharger 116 to prevent overshoot, as described herein. According to some implementations, when multiple turbochargers 116 are to include a recirculation system 120, each of the turbochargers 116 that includes a recirculation system 120 may include individual recirculation lines and/or recirculation valves that can be closed after the turbochargers reach a steady state (e.g., a threshold speed corresponding to a rated speed for the turbocharger) to conserve (and/or prevent loss of) boost power and/or performance of engine 102.

As indicated above, FIG. 1 is provided as an example. Other examples are possible and may differ from what was described in connection with FIG. 1.

Figure 2:
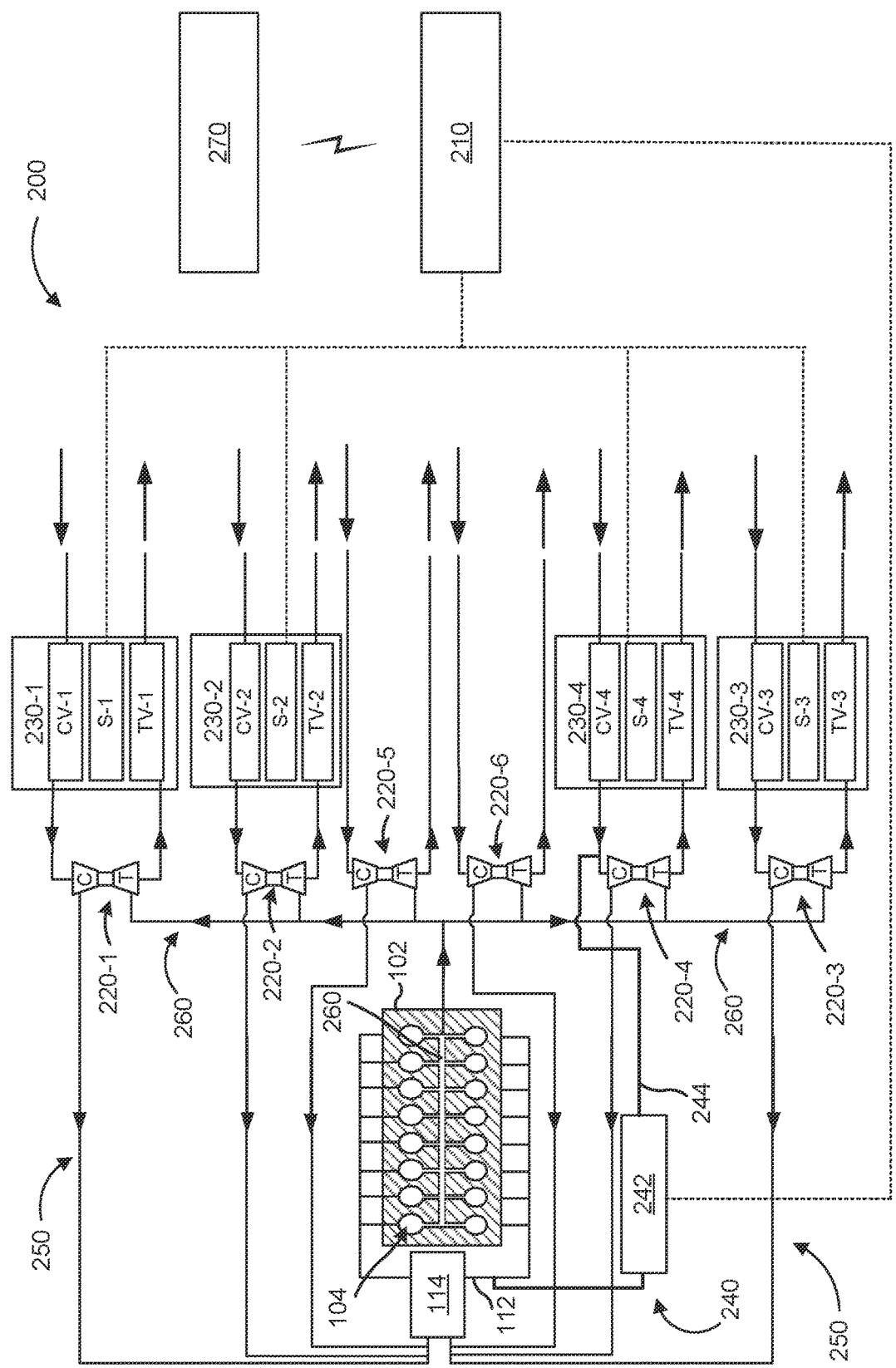
FIG. 2 is a schematic diagram of an example turbocharger system that may be implemented in association with the power system of FIG. 1, as described herein.

FIG. 2 is a schematic diagram of an example turbocharger system 200 that may be implemented in association with power system 100 of FIG. 1, as described herein. In reference to FIG. 2, one or more components of power system 100 are shown that correspond to the one or more components described in connection with FIG. 1. In FIG. 2, turbocharger system 200 is shown in association with engine 102, cylinders 104, intake manifold 112, and intercooler 114. Turbocharger system 200 includes an electronic control module (ECM) 210, a plurality of turbochargers 220 (e.g., corresponding to turbochargers 116 of FIG. 1 and identified in FIG. 2 as 220-1 to 220-6), a plurality of turbocharger control devices 230 (identified in FIG. 2 as 230-1 to 230-4), a recirculation system 240 that includes a recirculation valve 242 and recirculation line 244, an intake structure 250, an exhaust structure 260, and a sensor system 270.

As shown, each turbocharger 220 includes a compressor ("C") and a turbine ("T") coupled by a turbocharger shaft. The turbocharger shaft is a common shaft of the compressor and turbine such that rotational speed of a turbine corresponds to rotational speed of the compressor. As described herein, a turbocharger speed (e.g., rotational speed of turbocharger 220) may correspond to or be based on the rotational speed of a turbocharger shaft of a turbocharger 220. In FIG. 2, as exhaust gases exiting cylinders 104 flow through exhaust structure 260 to turbines of turbochargers 220 and expand against vanes thereof, the turbines rotate and drive the compressors to pressurize inlet air (e.g., ambient air from an environment of power system 100). The pressurized inlet air is provided, via intake structure 250, as charged air to intercooler 114, which cools the charged air (e.g., decreases a temperature of the charged air) prior to the charged air being fed into intake manifold 112. In this way, engine 102 generates power via combustion of a mixture of fuel and the cooled, charged air within cylinders 104, which creates exhaust gases that are released from cylinders 104 via exhaust structure 260.

Exhaust structure 260 may be situated in any suitable manner to allow exhaust gases to flow to turbines of turbochargers 220. Exhaust structure 260 may include an exhaust collection cavity and/or a plurality of exhaust conduits that run to the turbines of turbochargers 220. In some implementations, exhaust structure 260 may be configured so that exhaust gases cool by transferring heat from an exhaust log structure (e.g., situated inboard of engine 102) via conduction to engine coolant and/or water of an engine coolant system of engine 102.

In the example of FIG. 2, of the six turbochargers 220 that are included on the engine 102, two turbochargers 220-5 and 220-6, which may be arranged in a center of the set of the six turbochargers 220, are continuously fluidly interconnected to the intake structure 250 and exhaust structure 260, regardless of an operating mode of power system 100. In other words, the two turbochargers 220-5 and 220-6, during operation, are configured to always be active (e.g., to always be providing compressed air to engine 102). In other examples, zero, one, or more of turbochargers 220 may be similarly configured (e.g., depending on a size of the turbochargers, an engine power rating, an engine size, and/or the like).

Further, four remaining turbochargers 220-1 to 220-4 are configured to be selectively connectable or separable via turbocharger control devices 230 from the intake structure 250 and/or exhaust structure 260. For example, an effective turbocharger capacity or capability of power system 100, in the aggregate, can be 100% capacity when all turbochargers are operating and fluidly connected via turbocharger control devices (when the compressor valves and turbocharger valves are open). On the other hand, a minimum turbocharger capacity of about 33% can be achieved when all selectively connectable turbochargers 220-1 to 220-4 have been isolated, via turbocharger control devices 230, from power system 100, and the two permanently connectable turbochargers 220-5 and 220-6 are operating. In some implementations, the turbochargers 220 may be arranged in pairs such that ECM 210 may control power system 100 to operate with one, two or all three pairs of turbochargers 220 connected for operation.

As described herein, ECM 210 is to control (e.g., by sending control signals to turbocharger control devices 230) activation of turbochargers 220 (e.g., if turbochargers 220-5 and 220-6 are coupled with corresponding turbocharger control devices 230) such that each turbocharger 220 can be activated or deactivated individually and independently from the others. In this way, engine 102 may operate with any quantity of turbochargers 220 fluidly connected to the exhaust gas conduits, depending on an engine speed (e.g., a rotational speed of an output shaft of engine 102 satisfying a threshold rotational speed), an engine power rating, an engine size, and the like.

To fluidly include or isolate each of turbochargers 220-1 to 220-4, turbocharger control devices 230 include respective compressor valves (identified in FIG. 2 as CV-1 to CV-4), solenoids (identified in FIG. 2 as S-1 to S-4), and turbine valves (identified in FIG. 2 as TV-1 to TV-4). The solenoids may operate to control corresponding turbine valves and compressor valves, but separate actuators and/or different types of actuators can correspondingly be used within turbocharger control devices 230. During operation, each solenoid (e.g., according to a control signal from ECM 210 (shown by the dotted line)) can close a corresponding turbine valve to block a turbine from releasing exhaust via a turbine exhaust conduit and/or a compressor valve to fluidly block a compressor from receiving inlet air via a compressor inlet conduit and, thus, operationally, isolate and deactivate the respective turbocharger 220 from engine 102. Correspondingly, a solenoid (according to a control signal from ECM 210) can open the turbine valve and compressor valves to activate (or reactivate) a corresponding turbocharger 220 by fluidly reconnecting that turbocharger 220 to engine 102 to allow exhaust gas to flow through the turbine and air or a mixture of air with exhaust gas to flow through the compressor during engine operation.

In FIG. 2, recirculation system 240 includes recirculation valve 242 within a recirculation line 244 fluidly coupled to an inlet of the compressor of turbocharger 220-4 and intake manifold 112. In some implementations, recirculation system 240 may include a plurality of individual recirculation valves and recirculation lines individually associated with each of a set of turbochargers 220 (e.g., specifically turbochargers 220-1 to 220-4 in the example of FIG. 2). In such a case, recirculation valve 242 may serve as a main recirculation valve, and the individual recirculation valve for each turbocharger 220 can individually be controlled to allow or block recirculated airflow to a compressor of turbocharger 220.

To permit recirculated airflow from intake manifold 112 to the compressor of turbocharger 220-4, recirculation valve 242 (e.g., according to a control signal from ECM 210) may open to reduce or prevent overshoot of turbocharger 220-4 (e.g., to prevent a turbocharger speed of turbocharger 220-4 from exceeding a threshold speed). In some implementations, recirculation valve 242 may be mechanically coupled with the compressor valve CV-4 and/or the turbine valve TV-4 of control device 230-4, such that when the compressor valve CV-4 and/or the turbine valve TV-4 are simultaneously (and/or correspondingly) opened, recirculation valve is opened (e.g., for a threshold time period and/or until turbocharger 220-4 reaches a steady state turbocharger speed).

ECM 210 provides control of power system 100 (and/or turbocharger system 200) based on determining desired values for operating power system 100 and/or monitoring operating parameters of power system 100 to control recirculation system 240 to affect an operation of power system 100 (e.g., to increase or decrease airflow, to control a turbocharger speed of one or more of turbochargers 220, and/or the like). For example, ECM 210 may control recirculation valve 242 to adjust a flow of recirculated air to control a rotational speed of turbocharger 220-4. ECM 210 may monitor and/or detect operating values of one or more parameters of power system 100 based on one or more measurements, associated with the one or more parameters of power system 100, received from sensor system 270. In some implementations, ECM 210 may monitor and/or detect engine speeds of engine 102, rotational speeds of turbochargers 220, a pressure of turbocharger system 200 (e.g., an intake manifold air pressure (IMAP), a pressure within a section of intake structure 250, a pressure within a section of exhaust structure 260, and/or the like) in order to set a position of recirculation valve 242 to cause an adjustment to the rotational speed of turbocharger 220-4.

ECM 210 may execute the instructions to perform various control functions and processes to control power system 100 and to automatically adjust adjustable parameters of power system 100. ECM 210 may include any appropriate type of engine control system configured to perform engine control functions such that power system 100 may operate properly. Further, ECM 210 may also control another system of a vehicle or machine, such as a transmission system, a hydraulics system, and/or the like.

Sensor system 270 may provide measurements associated with various parameters used by ECM 210 to control turbochargers 220 and/or power system 100. Sensor system 270 may include physical sensors and/or any appropriate type of measurement system that generates measurements for values of parameters of power system 100 based on a computational model and/or one or more measured values.

As used herein, a parameter may refer to an operating condition of power system 100 that can be directly measured and/or estimated by one or more sensors (e.g., physical sensors, virtual sensors, and/or the like) of sensor system 270 or controlled by ECM 210. As described herein, the sensors may include speed sensors, pressure sensors, temperature sensors, content sensors, and/or the like. A value for a parameter may include any sensed measurement or output from the sensors and/or any value that may be measured indirectly by physical sensors and/or calculated based on readings of physical sensors. Measurements of a parameter, as used herein, may refer to any value relevant to the parameter and indicative of the state of a corresponding operating condition of the power system 100. For example, a measurement may include a value of a machine parameter and/or environmental parameter, such as a speed value (e.g., of turbochargers 220, of an output of engine 102, and/or the like), a pressure value (e.g., of intake manifold 112, of a section of intake structure 250, of a section of exhaust structure 260, and/or the like), a temperature value, a compression ratio, a turbocharger efficiency value, an exhaust measurement value, an ambient condition value, a fuel rate, and/or the like. A measurement may be included as an input to be provided to one or more virtual sensors.

Sensor system 270 may be configured to coincide with ECM 210, may be configured as a separate control system, and/or may be configured as a part of other control systems. Further, ECM 210 may implement sensor system 270 by using computer software, hardware, or a combination of software and hardware. For example, ECM 210 may execute instructions to cause sensors of Sensor system 270 to sense and/or generate operating values for parameters of power system 100 based on a computational model and other parameters.

In operation, computer software instructions may be stored in or loaded to ECM 210. ECM 210 may execute the computer software instructions to perform various control functions and processes to control power system 100 and to automatically adjust operational parameters, such as one or more airflows through power system 100, fuel injection timing and fuel injection pressure, rotational speed of engine 102 and/or turbocharger 220, and/or the like. Additionally, or alternatively, ECM 210 may execute computer software instructions to generate and/or operate sensor system 270 to provide engine temperature values, engine pressure values, engine emission values, engine speed values, actuator or valve position values, and/or other parameter values used to monitor and/or control power system 100.

Accordingly, ECM 210 may also identify, obtain, and/or determine values for parameters (e.g., desired values and/or operational values) that are associated with conditions (e.g., as sensed by sensor system 270) or settings corresponding to the operations of power system 100, such as engine speed, turbocharger speed, fuel rate or quantity, injection timing, intake manifold air temperature (IMAT), IMAP, intake valve actuation (IVA) position, IVA timing, injection air pressure, injection fuel pressure, torque delivered by engine 102, total fuel injection quantity, exhaust pressure, number of cylinders 104 firing, oxygen/fuel molar ratio, ambient temperature, ambient pressure (e.g., barometric pressure), and/or the like.

As indicated above, FIG. 2 is provided as an example. Other examples are possible and may differ from what was described in connection with FIG. 2.

Figure 3:
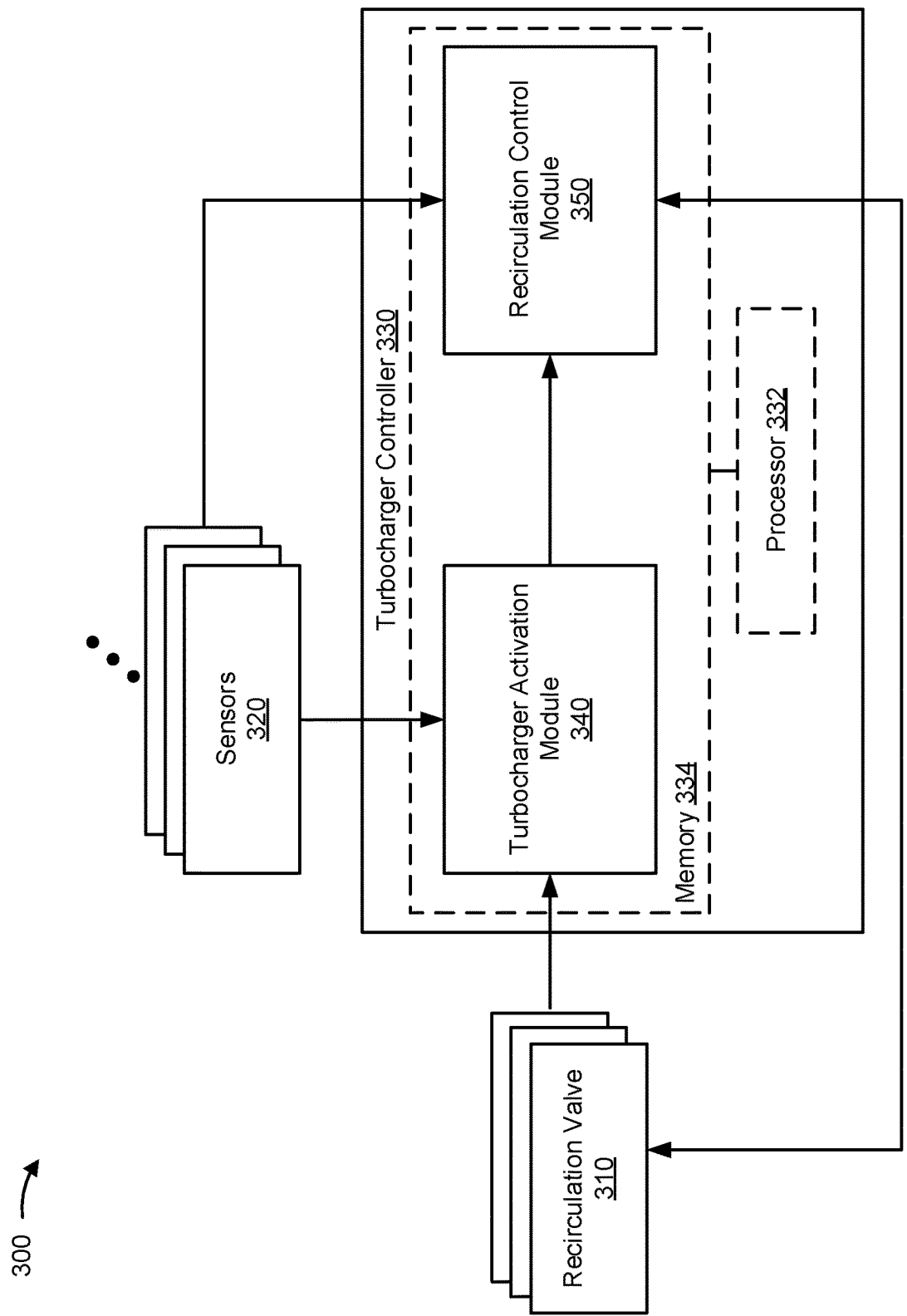
FIG. 3 is a diagram of an example turbocharger control system that may be included within the power system of FIG. 1, as described herein.

FIG. 3 is a diagram of an example turbocharger control system 300 that may be included within the power system of FIG. 1, as described herein. As shown in FIG. 3, turbocharger control system 300 includes one or more recirculation valves 310 (referred to herein individually as "recirculation valve 310," and collectively as "recirculation valves 310" and corresponding to recirculation valve 242 of FIG. 2), one or more sensors 320, and a turbocharger controller 330. Turbocharger controller 330 includes a processor 332, a memory 334, a turbocharger activation module 340, and a recirculation control module 350. As described herein, turbocharger controller 330 is implemented in hardware via processor 332 and/or memory 334.

Recirculation valve 310 may be any type of component and/or device that may be used by turbocharger controller 330 to control recirculated airflow from intake manifold 112 to a compressor of turbocharger 220-4 or any other turbocharger 220 of FIG. 2 that is associated with a recirculation system 240 (referred to in this example as a "turbocharger compressor"). For example, recirculation valve 310 may include one or more actuators, switches, integrated circuits (ICs), and/or the like that are capable of opening and/or closing a valve fluidly coupled (e.g., via one or more recirculation lines, such as recirculation line 244) with intake manifold 112 and an inlet of the turbocharger compressor. Recirculation valve 310 may be a binary valve that has an open position (e.g., a position that enables recirculated airflow from intake manifold 112 to the turbocharger compressor) and a closed position (e.g., a position that prevents recirculated airflow from intake manifold 112 to the turbocharger compressor). In some implementations, recirculation valve 310 may include a variable position valve that can be controlled to vary the geometry of a recirculation line fluidly coupled with intake manifold 112 and the inlet of the turbocharger compressor. For example, recirculation valve 310 may be set to variable positions between 100% closed (e.g., a position that prevents most or any recirculated airflow) and 100% open (e.g., a position that does not prevent or minimal prevents recirculated airflow).

As described herein, the position of recirculation valve 310 may affect a rotational speed of turbocharger 220-4. For example, when partially or fully opened, recirculated airflow to the turbocharger compressor may reduce the rotational speed of turbocharger 220-4 (e.g., due to compressed (and/or cool) air from intake manifold 112 increasing an intake pressure of the turbocharger compressor). On the other hand, when fully closed (e.g., once turbocharger 220-4 reaches a steady state, such as after recirculated airflow is allowed for a threshold period of time or once turbocharger 220-4 reaches a threshold speed, such as a steady state speed or rated speed), boost capability of engine 102 and/or the increase in boost from turbocharger 220-4 is maintained (e.g., by maintaining a desired IMAP with turbocharger 220-4 in a steady state). As described herein, a setting of recirculation valve 310 may be determined by recirculation control module 350 and/or turbocharger activation module 340. The setting of recirculation valve 310 may represent, indicate, or correspond to one or more of a position of an actuator, a length of time that a valve is open, a position of the valve, an IMAP that is to be achieved by recirculation valve 310, and/or the like.

Sensor 320 includes any type of sensor configured to measure operating conditions of power system 100 (e.g., to determine operating values corresponding to the operating conditions). Sensors 320 may be sensors of sensor system 270, as described herein. For example, sensors 320 may include temperature sensors to detect temperature of air, exhaust, a component, coolant, and/or the like. Sensors 320 may include position sensors to detect a position of a valve, an actuator, an engine part (e.g., a piston), and/or the like.

Sensors 320 may include speed sensors (e.g., to detect a turbocharger speed, an engine speed, a machine speed, and/or the like). Sensors 320 may include pressure sensors to detect a measure of compression of air or exhaust in power system 100. Sensors 320 may include content sensors, such as emissions sensors to detect emission levels of power system 100, such as an amount of NOx, an amount of carbon monoxide, an amount of hydrocarbon, an amount of particulate matter, an amount of soot, and/or the like.

Accordingly, one or more sensors 320 may be associated with one or more parameters (e.g., corresponding to operating conditions of engine 102) that may be monitored to determine an operating condition (e.g., in real-time) of power system 100, as described herein. For example, a value of a parameter associated with a sensor 320 may represent or indicate a measurement of sensor 320, such as a measured speed of engine 102 and/or turbocharger 220-4 by a speed sensor, a measured pressure (e.g., peak cylinder pressure (PCP), IMAP, a compressor surge margin, and/or the like) by a pressure sensor, a measured temperature (e.g., turbine inlet exhaust temperature, turbine outlet exhaust temperature, a compressor outlet temperature, and/or the like) by a temperature sensor, a measured position of an actuator (e.g., an actuator associated with recirculation valve 310, the solenoids of turbocharger control devices 230, and/or the like) by a position sensor, measured emission amounts by an emissions sensor, and/or the like.

Turbocharger controller 330 may correspond to ECM 210 of FIG. 2. Processor 332 is implemented in hardware, firmware, and/or a combination of hardware and software. Processor 332 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 332 includes one or more processors capable of being programmed to perform a function. Memory 334 includes a random-access memory (RAM), a read only memory (ROM), and/or another type of dynamic or static storage device (e.g., a flash memory, a magnetic memory, and/or an optical memory) that stores information and/or instructions for use by processor 332 (e.g., information and/or instructions associated with turbocharger activation module 340, recirculation control module 350, and/or the like).

Turbocharger activation module 340 includes one or more components or devices configured to control activation of turbochargers 220. Turbocharger activation module 340 may monitor, calculate or otherwise determine engine speed and power output of engine 102, in real time using sensors 320, and send appropriate control signals turbocharger control devices 230 to activate or deactivate turbochargers 220 individually, in pairs, or according to any other configuration. Turbocharger activation module 340 may determine which turbochargers 220 are to be active or inactive according to one or more power curves associated with operating engine 102. For example, in a first region of a power curve, which encompasses relatively low engine speeds and power outputs, two turbochargers (e.g., turbochargers 220-5 and 220-6) may be active and four turbochargers (e.g., 220-1 to 220-4) may be inactive or fluidly separated or isolated from intake structure 250 and/or exhaust structure 260 of engine 102. In a second region of the example power curve, which encompasses mid-range engine speeds and power outputs, two of the inactive turbochargers may be activated relative to the first region such that four turbochargers (e.g., turbochargers 220-1, 220-2, 220-5, and 220-6) may be active and two turbochargers (e.g., turbochargers 220-3 and 220-4) may be inactive. Finally, in a third region of the example power curve, which encompasses high-range engine speeds and power outputs, all six turbochargers (e.g., turbochargers 220-1 to 220-6) may be active.

In some implementations, transition of operating engine 102 from one region of a power curve to another may include at least some hysteresis so engine 102 is stable. For example, for engines that may rarely operate in the third region of the example power curve, turbocharger activation module 340 may mix and match the pairs of turbochargers 220 that are activated during operation within the second region, such that all turbochargers 220 mounted on engine 102 have an equal opportunity to operate and wear at relatively the same rate over the life of power system 100. For example, if four selectively activatable turbochargers (e.g., turbochargers 220-1 to 220-4 of FIG. 2) are present in the engine, the controller may follow a sequence of turbocharger activation and/or perform health-checks (e.g., using measurements from sensors 320) of active turbochargers 220 to determine conditions of turbochargers 220.

Turbocharger activation module 340 may include an uptime time counter for each selectively activatable turbocharger 220, and select the turbocharger(s) 220 with a lowest uptime for activation while no faults have been detected for any one of the particular turbochargers 220 in queue for activation. Alternatively, and while no faults are detected, turbocharger activation module 340 may track a predefined set of turbochargers 220 (e.g., a single turbocharger, pairs of turbochargers, and/or the like) for activation, which are arranged to activate different turbochargers 220 at different times and/or according to different operating conditions of power system 100. These predefined sets can be made up by a sequence containing different permutations of turbocharger sets selected from the group of available turbochargers 220 that can be put online. As an example, for turbochargers denoted as A, B, C and D, a sequence of turbocharger pairs can be: AB, BC, CD, DA, AC, BD and so forth. In some implementations, when a fault is detected in a particular turbocharger 220 (e.g., using any suitable fault monitoring technique), turbocharger activation module 340 can effectively take that turbocharger 220 out of service and control the remaining turbochargers 220 to be cycled through accordingly. The changes to the active turbochargers can be carried out either when changing the operating regions of the engine, and also during an engine de-rate condition, where power is reduced temporarily during normal operation before increasing again.

According to some implementations, when turbocharger activation module 340 is to active a turbocharger 220 of power system 100, turbocharger activation module 340 may notify recirculation control module 350 to permit recirculation control module 350 to control recirculation valve 310 accordingly. For example, if turbocharger activation module 340 determines, according to an activation sequence for turbochargers 220 and/or an operating condition of power system 100 (e.g., an engine speed, a power output, and/or the like) that turbocharger 220-4 is to be activated (e.g., as a next turbocharger of turbochargers 220 to be activated and/or a final turbocharger of all six turbochargers 220 to be activated), turbocharger activation module 340 may notify recirculation control module 350 to control a setting of recirculation valve 310 based on one or more operating conditions of power system 100 and/or turbocharger system 200 (e.g., an engine speed of engine 102, a turbocharger speed of turbocharger 220-4, and/or the like).

Recirculation control module 350 may include one or more components or devices configured to control recirculation valve 310. For example, recirculation valve 310 may be configured to send a control signal (e.g., a command, instructions, and/or the like) that indicates a setting of recirculation valve 310. More specifically, recirculation control module 350 may indicate that recirculation valve 310 is to be in a particular position (e.g., open, partially closed (e.g., at a particular position that adjusts a geometry of recirculated airflow to a compressor of turbocharger 220-4), closed, and/or the like).

Referring to the specific example of turbocharger 220-4, when turbocharger 220-4 is to be activated, recirculation control module 350 may control recirculation valve 310 (e.g., determine the setting for recirculation valve 310) based on receiving a desired value for a target speed of turbocharger 220-4 (e.g., from turbocharger activation module 340) and an operating speed of turbocharger 220-4 (from a sensor 320 configured to monitor the speed of turbocharger 220-4). In some implementations, recirculation control module 350 may set a position for recirculation valve 310 as a function of the difference between the desired turbocharger speed and the operating turbocharger speed. Additionally, or alternatively, turbocharger activation module 340 may utilize a mapping of value differences for desired and operating turbocharger speeds to corresponding adjustments to recirculation valve 310. The mapping may be stored and/or maintained in a data structure (e.g., a database, a table, an index, a graph, and/or the like) of memory 334. In some implementations, the mapping associated with recirculation control module 350 may include values (e.g., speed values, pressure values, temperature values, and/or the like) associated with certain constraints of certain parameters and/or components of power system 100, including rated or maximum speeds of turbochargers 220.

Accordingly, as described herein, turbocharger controller 330 of turbocharger control system 300 may be configured to use recirculation valve 310 to control operating speeds of turbochargers 220. In this way, turbocharger controller 330 may control turbocharger 220 to operate at a rated speed to extend a useful life of turbocharger 220 and/or power system 100.

As indicated above, FIG. 3 is provided as an example. Other examples are possible and may differ from what was described in connection with FIG. 3.

FIG. 4 is a flowchart of an example process 400 associated with a recirculation system for a power system that includes a plurality of turbochargers. In some implementations, one or more process blocks of FIG. 4 may be performed by turbocharger controller (e.g., turbocharger controller 330). In some implementations, one or more process blocks of FIG. 4 may be performed by another device or a group of devices separate from or including the turbocharger controller 330, such as an ECM (e.g., ECM 210), a sensor (e.g., a sensor of sensor system 270, sensor 320, and/or the like), and/or the like.

As shown in FIG. 4, process 400 may include determining that a turbocharger of the plurality of turbochargers is to be activated (block 410). For example, the turbocharger controller (e.g., using processor 332, memory 334, turbocharger activation module 340, recirculation control module 350, and/or the like) may determine, according to a sequence for individually activating a plurality of turbochargers of an engine, that a designated turbocharger of the plurality of turbochargers is to be activated, as described above.

The turbocharger may determine that the designated turbocharger is to open based on determining that a turbine valve coupled to a turbine of the designated turbocharger is to open. In some implementations, the designated turbocharger is a final turbocharger (and/or determined to be a final turbocharger) of the plurality of turbochargers that is to be activated in the sequence.

As further shown in FIG. 4, process 400 may include causing a recirculation valve associated with the turbocharger to open (block 420). For example, the turbocharger controller (e.g., using processor 332, memory 334, turbocharger activation module 340, recirculation control module 350, and/or the like) may cause a recirculation valve of a recirculation line to open to increase an airflow between an intake manifold and a compressor of the designated turbocharger, as described above. The recirculation valve may be configured within the recirculation line between the intake manifold and the compressor.

The turbocharger may cause the recirculation valve to be opened until the designated turbocharger reaches a threshold speed, until a threshold time period elapses (e.g., a designated amount of time to get the turbocharger to a steady state and/or rated speed), and/or the like. In some implementations, after causing the recirculation valve to be opened, the turbocharger controller may determine that the designated turbocharger has reached a steady state and cause the recirculation valve to close to prevent the airflow between the intake manifold and the compressor.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

During operation, an ECM may be configured to optimize a set of parameters (e.g., using an optimization model) and/or control the operation of a power system according optimization values for the set of parameters. In some instances, optimization values for the set of parameters may cause certain components of the power system to operate outside of critical ranges and/or design constraints that are configured to maintain the performance features and/or operational characteristics.

As described herein, turbocharger control system 300 may utilize recirculation valve 310 to control the power system 100 based on a desired operating condition and an actual operating condition of power system 100. For example, turbocharger controller 330 of turbocharger control system 300 may set a position of recirculation valve 310 to adjust recirculated airflow between intake manifold 112 and one or more compressors of turbochargers 220 (e.g., when turbochargers 220 are to be activated and/or onboarded to increase airflow to engine 102). Accordingly, turbocharger controller 330 may control the rotational speed of designated turbochargers 220 (e.g., according to sequential activation of turbochargers 220) to stay within a designed operational range of turbochargers 220. Maintaining the rotational speeds of turbocharger 220 to be within the designed operational ranges may enhance the durability and life span of turbochargers 220, thus reducing costs associated with replacing turbochargers 220 due to turbochargers 220 operating outside of the designed operational range (e.g., greater than a threshold speed or rated speed of turbochargers 220).

Furthermore, turbocharger control system 300 enables control of turbocharger 220 (e.g., a rotational speed of turbocharger 220) without utilizing individual wastegates or other mechanical components associated with exhaust structure 260. Therefore, turbocharger control system 300 enables a reduction in design resources (e.g., computing resources, power resources, and/or the like) for power system 100 because exhaust structure 260 may be relatively simplified by not including a wastegate or any other similar component to individually control turbochargers 220.

Furthermore, turbocharger control system 300 may enable control of turbochargers 220 without adjusting a fuel injection setting of power system 100. For example, if a rotational speed of turbocharger 220 is to be reduced, turbocharger controller 330 may cause recirculation valve 310 to enable recirculated airflow to slow the rotational speed without reducing an amount of fuel being injected into cylinders 104 of engine 102. In such a case, turbocharger controller 330 permits engine 102 to maintain a desired torque or power output while reducing the speed of turbocharger 220. Accordingly, engine 102 may achieve a desired performance without letting turbocharger 220 enter a hazardous operating condition (e.g., reach a rotational speed that overshoots the maximum turbocharger speed when being activated and/or while operating).

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A power system comprising:
an engine;
a plurality of turbochargers associated with the engine;
a recirculation system configured between a first turbocharger of the plurality of turbochargers and an intake manifold of the engine; and
a controller to:
determine that the first turbocharger is to be activated according to a turbocharger activation sequence associated with the plurality of turbochargers; and
cause, based on determining that the first turbocharger is to be activated, a recirculation valve of the recirculation system to open to allow airflow between the intake manifold and a compressor of the first turbocharger,
wherein the recirculation system includes a recirculation line that is fluidly coupled to the intake manifold of the engine and the compressor of the first turbocharger,
wherein the recirculation valve is configured within the recirculation line to control the airflow to prevent a speed of the first turbocharger from exceeding a threshold.

2. The power system of claim 1, wherein the plurality of turbochargers are configured to be individually activated according to a sequence and based on an engine speed of the engine,
 wherein the first turbocharger is a final turbocharger of the sequence that is to be activated.

3. The power system of claim 1, wherein the controller, when determining that the first turbocharger is to be activated, determines that the first turbocharger is to be activated based on:
 an engine speed of the engine satisfying a threshold, and
 all remaining turbochargers, of the plurality of turbochargers, being activated.

4. The power system of claim 1, wherein the controller is to, when causing the recirculation valve to open, open a turbine valve that is fluidly coupled to a turbine of the first turbocharger.

5. The power system of claim 1, wherein the controller is further to:
 cause the recirculation valve to close after at least one of:
 a speed of the first turbocharger reaches a threshold speed, or
 a threshold period of time, from causing the recirculation valve to open, elapses.

6. The power system of claim 1, wherein the recirculation valve is a first recirculation valve of the recirculation system, and the controller is to:
 determine, according to a sequence, that a second turbocharger of the plurality of turbochargers is to be activated after the first turbocharger is activated; and
 cause a second recirculation valve of the recirculation system to open to allow airflow between the intake manifold and a compressor of the second turbocharger.

7. A power system comprising:
 an engine;
 a plurality of turbochargers associated with the engine;
 a recirculation system configured between a first turbocharger of the plurality of turbochargers and an intake manifold of the engine; and
 a controller to:
 determine that the first turbocharger is to be activated according to a turbocharger activation sequence associated with the plurality of turbochargers; and
 cause, based on determining that the first turbocharger is to be activated, a recirculation valve of the recirculation system to open to allow airflow between the intake manifold and a compressor of the first turbocharger,
 the power system further comprising:
 an intake cooling system to provide cooled air to the intake manifold of the engine,
 wherein the airflow between the intake manifold and the compressor of the first turbocharger includes the cooled air to slow a speed of the first turbocharger as the first turbocharger is activated.

8. A method for controlling overshoot of a turbocharger of a power system, the method comprising:
 determining, according to a sequence for individually activating a plurality of turbochargers of an engine, that a designated turbocharger of the plurality of turbochargers is to be activated; and
 causing a recirculation valve of a recirculation line to open to increase an airflow between an intake manifold and a compressor of the designated turbocharger,
 wherein causing the recirculation valve to increase the airflow comprises:
 causing the recirculation valve to be opened until the designated turbocharger reaches a threshold speed.

9. The method of claim 8, wherein determining that the designated turbocharger is to be activated comprises:
 determining that a turbine valve coupled to a turbine of the designated turbocharger is to open.

10. The method of claim 8, wherein the recirculation valve is configured within the recirculation line between the intake manifold and the compressor.

11. The method of claim 8, wherein the designated turbocharger is a final turbocharger of the plurality of turbochargers that is to be activated in the sequence.

12. A method for controlling overshoot of a turbocharger of a power system, the method comprising:
 determining, according to a sequence for individually activating a plurality of turbochargers of an engine, that a designated turbocharger of the plurality of turbochargers is to be activated;
 causing a recirculation valve of a recirculation line to open to increase an airflow between an intake manifold and a compressor of the designated turbocharger;
 determining, after causing the recirculation valve to be opened, that the designated turbocharger has reached a steady state; and
 causing the recirculation valve to close to prevent the airflow between the intake manifold and the compressor.

13. A turbocharger configuration for an engine, the turbocharger configuration comprising:
 a plurality of turbochargers that are sequentially activated to provide airflow to the engine according to a characteristic of the engine; and
 a recirculation system situated between an intake manifold of the engine and a compressor of a designated turbocharger of the plurality of turbochargers,
 wherein the recirculation system is configured to prevent, by recirculating air from the intake manifold to the compressor, the designated turbocharger from exceeding a threshold speed after the designated turbocharger is activated to increase airflow to the engine.

14. The turbocharger configuration of claim 13, wherein the designated turbocharger is a final turbocharger, of the plurality of turbochargers, that is to be activated according to a sequence.

15. The turbocharger configuration of claim 13, wherein the designated turbocharger is activated by opening a turbine valve that is fluidly coupled with a turbine of the designated turbocharger, and
 wherein the recirculation system is configured to prevent overshoot of the designated turbocharger by opening a recirculation valve between the intake manifold and the engine when the turbine valve is opened.

16. The turbocharger configuration of claim 15, wherein the turbine valve and the recirculation valve are configured to open simultaneously based on being mechanically coupled with a same actuator.

17. The turbocharger configuration of claim 13, wherein the characteristic of the engine comprises at least one of:
 an engine speed of the engine, or
 a power output of the engine.

18. The turbocharger configuration of claim 13, wherein the recirculation system is configured to:
 open a recirculation valve to recirculate the air from the intake manifold to the compressor to prevent the designated turbocharger from exceeding the threshold speed, and close the recirculation valve to conserve boost of the engine after the designated turbocharger reaches a steady state speed.

\* \* \* \* \*